United States Patent
Han et al.

(10) Patent No.: US 9,277,423 B2
(45) Date of Patent: Mar. 1, 2016

(54) METHOD AND APPARATUS FOR TRANSMITTING/RECEIVING A REFERENCE SIGNAL IN A WIRELESS COMMUNICATION SYSTEM

(71) Applicant: Samsung Electronics Co., Ltd., Gyeonggi-do (KR)

(72) Inventors: Jin Kyu Han, Seoul (KR); Youn Sun Kim, Gyeonggi-do (KR); Cheng Shan, Gyeonngi-do (KR); In Ho Lee, Gyeonngi-do (KR); Sung Tae Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 115 days.

(21) Appl. No.: 13/716,834

(22) Filed: Dec. 17, 2012

(65) Prior Publication Data

US 2013/0142121 A1 Jun. 6, 2013

Related U.S. Application Data

(63) Continuation of application No. 12/862,389, filed on Aug. 24, 2010, now Pat. No. 8,355,367.

(30) Foreign Application Priority Data

Aug. 24, 2009 (KR) .......................... 10-2009-0078397

(51) Int. Cl.
*H04B 7/06* (2006.01)
*H04L 5/00* (2006.01)
(Continued)

(52) U.S. Cl.
CPC ............. *H04W 24/02* (2013.01); *H04B 7/0689* (2013.01); *H04L 5/0023* (2013.01); *H04L 5/0048* (2013.01); *H04B 7/024* (2013.01); *H04W 72/1273* (2013.01); *H04W 88/10* (2013.01)

(58) Field of Classification Search
None
See application file for complete search history.

(56) References Cited

U.S. PATENT DOCUMENTS 8,179,775 B2 5/2012 Chen et al.
8,274,959 B2 * 9/2012 Lee et al. ....................... 370/338
(Continued)

FOREIGN PATENT DOCUMENTS

CN 101478338 7/2009
CN 101483455 7/2009
(Continued)

OTHER PUBLICATIONS

ZTE, "Downlink Reference Signal Design for LTE-Advanced", 3GPP TSG-RAN WG1 #56, R1-090634, Feb. 9-13, 2009.
(Continued)

*Primary Examiner* — Hong Cho
(74) *Attorney, Agent, or Firm* — The Farrell Law Firm, P.C.

(57) ABSTRACT

A method and apparatus for transmitting/receiving reference signals in Long Term Evolution (LTE) and LTE-Advanced (LTE-A) systems includes determining whether a dedicated reference signal is detected in a current subframe; estimating, if a dedicated reference signal is detected in the current subframe, a data channel using the dedicated reference signal to receive data; and estimating, if no dedicated reference signal is detected in the current subframe, a data channel using a common reference signal detected in the current subframe to receive data. The transmission scheme uses a DeModulation Reference Signal (DM-RS) for channel response estimation. To secure backward compatibility of the LTE-A system, a Common Reference Signal is transmitted in normal subframes.

12 Claims, 8 Drawing Sheets

(51) Int. Cl.
  *H04B 7/02*   (2006.01)
  *H04W 72/12*  (2009.01)
  *H04W 88/10*  (2009.01)
  *H04W 24/02*  (2009.01)

(56) References Cited

U.S. PATENT DOCUMENTS

| | | | |
|---|---|---|---|
| 2006/0013338 A1 | 1/2006 | Gore et al. | |
| 2008/0212702 A1 | 9/2008 | Pan et al. | |
| 2009/0252077 A1* | 10/2009 | Khandekar et al. | 370/312 |
| 2010/0195481 A1 | 8/2010 | Lee et al. | |
| 2010/0260169 A1* | 10/2010 | Gheorghiu et al. | 370/350 |
| 2010/0322100 A1* | 12/2010 | Wan et al. | 370/252 |
| 2010/0322179 A1* | 12/2010 | Yu et al. | 370/329 |
| 2011/0096704 A1 | 4/2011 | Erell et al. | |
| 2011/0292825 A1 | 12/2011 | Lee et al. | |
| 2012/0033643 A1* | 2/2012 | Noh et al. | 370/335 |
| 2012/0155561 A1* | 6/2012 | Seo et al. | 375/260 |

FOREIGN PATENT DOCUMENTS

| | | |
|---|---|---|
| JP | 2008-066780 | 3/2008 |
| JP | 2008-507213 | 3/2008 |

OTHER PUBLICATIONS

Motorola et al., "Way Forward on Dedicated Reference Signal Design for LTE Downlink with Normal CP", 3GPP TSG-RAN Meeting #52, R1-0801108, Feb. 11-15, 2008.
LG Electronics, "Downlink Reference Signal Design for Higher Order MIMO", 3GPP TSG RAN WG1 Meeting #55 bis, R1-090218, Jan. 12-17, 2009.
Texas Instruments, "Downlink Reference Signal Multiplexing for 8Tx Transmission", 3GPP TSG RAN WG1 #56, R1-090592, Feb. 12-16, 2009.
Texas Instruments, "Refinement on Downlink Reference Signal Design", R1-091291, 3GPP TSG RAN WG1 #56bis, Mar. 23-27, 2009.
Nokia et al., "DL Control Signalling for Dual-Layer Beamforming in Rel'9", R1-093300, 3GPP TSG-RAN WG1 Meeting #58, Aug. 24-28, 2009.
Nokia et al., "Beamforming Mode Evolution: From LTE Rel-8 to LTE-Advanced", R1-091576, 3GPP TSG RAN WG1 Meeting #56-bis, Mar. 23-27, 2009.
LG Electronics, "Issues on Higher Order MIMO", R1-091217, 3GPP TSG RAN WG1 Meeting #56bis, Mar. 23-27, 2009.
Research in Motion et al., "4-tx Transmission Configuration in LTE-A", R1-093284, 3GPP TSG RAN WG1 Meeting #58, Aug. 24-28, 2009.
Samsung, "Transmit Diversity in MBSFN Subframes", R1-093403, 3GPP TSG RAN WG1 #58, Aug. 24-28, 2009.
European Search Report dated Aug. 7, 2014 issued in counterpart Appln. No. 10812232.6.
European Search Report dated Aug. 7, 2014 issued in counterpart Appln. No. 14166423.5.
Chinese Office Action dated Sep. 23, 2014 issued in counterpart Appln. No. 201080048005.1.
Japanese Office Action dated Oct. 21, 2014 issued in counterpart Appln. No. 2012-526632.
InterDigital Communications, LLC, "DL Control Signaling for LTE Rel-9 Dual-Layer Beamforming", R1-093066, 3GPP TSG RAN WG1 Meeting #58, Aug. 24-28, 2009.
Korean Office Action dated May 18, 2015 issued in counterpart application No. 10-2009-0078397.
Nokia Corporation et al., "On Supporting Dynamic MBSFNs and Transmission Mode Switching in MBMS", R2-074849, 3GPP TSG-RAN WG2 Meeting #60, Nov. 5-9, 2007.
ZTE, "Discussion on Transmission Mode about Beamforming in Rel-9", R1-091705, 3GPP TSG RAN WG1 Meeting #57, May 4-8, 2009.
Japanese Office Action dated Feb. 16, 2015 issued in counterpart application No. 2014-087952.

* cited by examiner

METHOD AND APPARATUS FOR TRANSMITTING/RECEIVING A REFERENCE SIGNAL IN A WIRELESS COMMUNICATION SYSTEM

PRIORITY

This application is a Continuation Application of U.S. patent application Ser. No. 12/862,389, which was filed in the U.S. Patent and Trademark Office on Aug. 24, 2010, and claims priority to Korean Patent Application No. 10-2009-0078397, which was filed in the Korean Intellectual Property Office on Aug. 24, 2009, the contents of each of which are incorporated herein by reference.

BACKGROUND OF THE INVENTION

1. Field of the Invention

The present invention generally relates to wireless communications and, in particular, to a method and apparatus for transmitting/receiving reference signals in Long Term Evolution (LTE) and LTE-Advanced (LTE-A) systems based on the $3^{rd}$ Generation Partnership Project (3GPP) standards.

2. Description of the Related Art

With the advance of communication technologies, the conventional voice telephony-oriented mobile communication systems have evolved to high speed, high quality packet data-oriented mobile communication systems for providing data and multimedia services. In order to support such high speed, high quality data transmission services, various mobile communication technologies have been standardized. These technologies include 3GPP High Speed Packet Access (HSPA) and LTE, 3GPP2 High Rate Packet Data (HRPD) and Ultra Mobile Broadband (UMB), and IEEE 802.16e.

In order to improve transmission efficiency, these mobile communication technologies use various advanced techniques such as Adaptive Modulation and Coding (AMC) and channel sensitive scheduling. The AMC technique allows the transmitter to adjust the data rate according to the channel condition. The AMC technique decreases the data rate for bad channel conditions so as to maintain a reception error rate at an intended level and increases the data rate for good channel conditions to maximize the throughput. The channel sensitive scheduling technique allows the transmitter to provide the service to a receiver having the best channel condition among a plurality of receivers, thereby improving system throughput.

The AMC and channel sensitive scheduling techniques receive Channel State Information (CSI) fed back from the receivers and perform data transmission at an optimal timing with an optimal modulation and coding scheme. The AMC and channel sensitive scheduling techniques can be referred to as techniques for improving transmission efficiency with the enough information on the transmission channel. In a Frequency Division Duplex (FDD) system in which the transmitter cannot analogize the transmission channel condition from the reception channel, the receiver is designed to feed back transmission channel information to the transmitter. Meanwhile, a Time Division Duplex (TDD) system has a characteristic that the transmission channel condition is analogous to the reception channel condition such that there is no need for the receiver to report the information on the transmission channel to the transmitter.

Recently, research has been conducted to replace the Code Division Multiple Access (CDMA) scheme dominant in the $2^{nd}$ and $3^{rd}$ generation mobile communication systems with the Orthogonal Frequency Division Multiple Access (OFDMA) scheme. Actually, the standardization organizations such as 3GPP, 3GPP2, and IEEE are in the middle of standardization of the advanced communication systems adopting OFDMA or modified OFDMA. This is because OFDMA is expected to provide superior throughput as compared to CDMA. One of the main factors that allows OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

The LTE system uses Orthogonal Frequency Division Multiplexing (OFDM) in the downlink and Single Carrier Frequency Division Multiple Access (SC-FDMA) in the uplink. Both OFDM and SC-FDMA have the characteristics allowing frequency domain scheduling.

In the meantime, the LTE system supports multiple antenna transmission in the downlink (DL). An LTE transmitter can be provided with one, two, or four transmit antennas. By using multiple antennas, beamforming gain and spatial multiplexing gain can be achieved with a precoding scheme.

The LTE-A system can support up to 8 transmit antennas in the downlink. As the number of transmit antennas increases, the transmitter can further improve the beamforming gain and spatial multiplexing gain. In addition, the LTE-A system can support other various transmission techniques in the downlink. One of the newly introduced downlink transmission techniques is Coordinated Multi-Point (CoMP), which improves the communication quality of specific receivers through the cooperation of multiple cells. In terms of downlink CoMP, two different approaches can be considered: Joint Transmission (JT) in which multiple transmission points transmit signals to a single receiver simultaneously and Coordinated Scheduling/Coordinated Beamforming (CS/CB) in which the receiver receives the signal transmitted by its serving cell. However, the scheduling including any beamforming functionality is dynamically coordinated between the cells in order to control and/or reduce the interference between different transmissions. Unlike JT in which multiples cells have to prepare the symbol streams simultaneously, CS/CB can be implemented by exchanging the scheduling and beamforming information among the multiple cells. This means that, although JT is expected to secure higher performance gain, there are many problems to be solved for implementation such as high traffic load and low delay requirement between cells. In contrast, CS/CB gives relatively low performance gain but is advantageous to the low traffic load between cells.

SUMMARY OF THE INVENTION

In order to solve the problems of the prior art, the present invention provides a method and apparatus for transmitting/receiving reference signals in an LTE-A system that is capable of improving system throughput without compromising backward compatibility with LTE system.

Also, the present invention provides a method and apparatus for transmitting/receiving reference signals in an LTE-A system that is capable of supporting legacy LTE receivers without degrading reception performance.

In accordance with an aspect of the present invention, a method for receiving data includes determining whether a dedicated reference signal is detected in a current subframe; estimating, if a dedicated reference signal is detected in the current subframe, a data channel using the dedicated reference signal to receive data; and estimating, if no dedicated reference signal is detected in the current subframe, a data channel using a common reference signal detected in the current subframe to receive data.

In accordance with another aspect of the present invention, a receiver includes a receive controller which determines whether a dedicated reference signal is detected in a current subframe; a channel estimator which estimates a data channel, if a dedicated reference signal is detected in the current subframe, using the dedicated reference signal and, if no dedicated reference signal is detected in the current subframe, using a common reference signal detected in the current subframe; and a data processor which processes the data channel to receive data.

In accordance with another aspect of the present invention, a method for transmitting data includes notifying whether to transmit a dedicated reference signal in a current subframe by higher layer signaling; generating, if transmission of the dedicated reference signal is notified, the dedicated reference signal, a common reference signal, and data signal and, otherwise, the common reference signal and the data signal; and multiplexing the data signal and at least one of the dedicated reference signal and common reference signal into the current subframe.

In accordance with still another aspect of the present invention, a transmitter includes a transmit controller which determines whether to transmit a dedicated reference signal in a current subframe by higher layer signaling; a signal generator which generates, if transmission of the dedicated reference signal is determined, the dedicated reference signal, a common reference signal, and data signal and, otherwise, the common reference signal and the data signal; and a multiplexer which multiplexes the data signal and at least one of the dedicated reference signal and common reference signal into the current subframe.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In the following description, "Reference Signal (RS)" denotes the signal predefined between the transmitter and the receiver for two purposes. The first purpose of the RS is to allow the receiver to measure the CSI. In order to support AMC, the transmitter has to receive the CSI reported by the receiver. The receiver can measure the CSI using the RS. The second purpose of the RS is to allow the receiver to demodulate the signal transmitted by the transmitter. In the case where the transmitter sends a complex signal, the receiver has to estimate distortion of the signal received on the channel for coherent demodulation. That is, the receiver can estimate the channel response using the received RS.

There is the RS that is defined, in the downlink of the LTE system, to be commonly used by all of the receivers within a cell. This type of RS is referred to as Common RS (CRS) or cell-specific RS because it is defined per cell. In the case where the transmitter transmits signals through multiple transmit antennas, the CRS is designed to be orthogonal between transmit antennas. For example, when two transmit antennas are used, the transmitter defines two CRSs that are orthogonal with each other and transmits the CRSs through respective transmit antennas.

Figure 1:
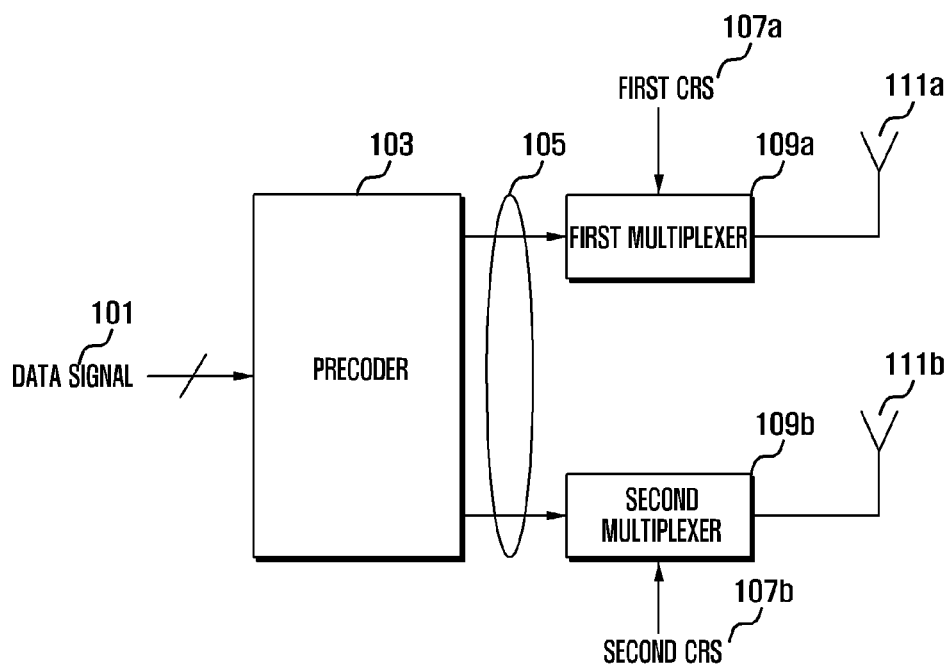
FIG. 1 is a block diagram illustrating a configuration of a downlink transmitter using CRS in an LTE system.

FIG. 1 is a diagram illustrating a configuration of a downlink transmitter using CRS in the LTE system. Although the description is directed to the transmitter having two transmit antennas, the present invention is not limited thereto. For example, the present invention can be applied to the transmitters having more than two transmit antennas.

As shown in FIG. 1, the transmitter 100 includes a precoder 103, a first multiplexer 109a, a second multiplexer 109b, a first transmit antenna 111a, and a second transmit antenna 111b. In this structure, the transmitter 100 multiplexes the data signal 101 with CRSs 107a and 107b before transmission.

The precoder 103 performs beamforming on the input data signal 101 destined for a receiver (not shown). Here, the data signal 101 can be configured in one or multiple layers. In the case where the data signal 101 is configured in a single layer, the precoding process can be considered as normal beamforming. In the case where the data signal 101 is configured in multiple layers, the precoding process can be considered as per-layer beamformings for spatial diversity. The precoded signal 105 is output to the first multiplexer 109a and the second multiplexer 109b. The first multiplexer 109a multiplexes the precoded signal 105 and the first CRS 107a and transmits the multiplexed signal through the first transmit antenna 111a. The second multiplexer 109b multiplexes the precoded signal 105 and the second CRS 107b and transmits the multiplexed signal through the second transmit antenna 111b.

In the downlink transmission using the CRSs 107a and 107b, the CRSs 107a and 107b are not precoded while the data signal 101 is precoded as shown in FIG. 1. Accordingly, the receiver measures CSI using the CRSs 107a and 107b that are transmitted without being precoded. The receiver can report the CSI itself to the transmitter 100 directly or the most preferred transmission scheme in the given channel condition to the transmitter 100.

In the LTE system, the feedback information is defined with the preferred transmission scheme, and the feedback information defined for supporting DL transmission in the LTE system includes Channel Quality Indicator (CQI), Precoding Matrix Indicator (PMI), and Rank Indicator (RI). The CQI, PMI, and RI indicate the modulation and coding scheme, precoding matrix, and number of spatial multiplexing layers that are preferred in the given channel condition, respectively.

In the case of reporting CQI, PMI, and RI, however, the precoding scheme is limited since the receiver can use the precoding matrices defined in the precoding codebook specified in the standard. For example, the receiver selects the most preferred one of the precoding matrices defined in the precoding codebook and reports the selected matrix to the transmitter such that the transmitter applies the reported precoding matrix, which is retrieved from the precoding codebook, to the actual transmission. Accordingly, the transmitter cannot apply other precoding matrices that are not defined in the precoding codebook. In the LTE system, the information related to the precoding scheme which is actually used for transmitting data signal is included in Downlink Control Information (DCI).

Meanwhile, introduction of a direct CSI report in place of the CQI, PMI, and RI reports is under discussion in 3GPP. The direct CSI report is advantageous since the receiver can determine the precoding scheme. In this case, however, it is difficult for the transmitter to use a precoding matrix that is not defined in the precoding codebook with the CRS-based transmission scheme. This means that, since there can be an infinite number of precoding matrices, it is impossible to report the precoding scheme using DCI. In the LTE system, a UE-specific RS, i.e. a Dedicated RS (DRS), is defined only for the single layer transmission. The DRS is precoded with the precoding scheme used on the data information. Accordingly, the receiver can estimate the precoded channel using the DRS and demodulate the precoded data signal.

Figure 2:
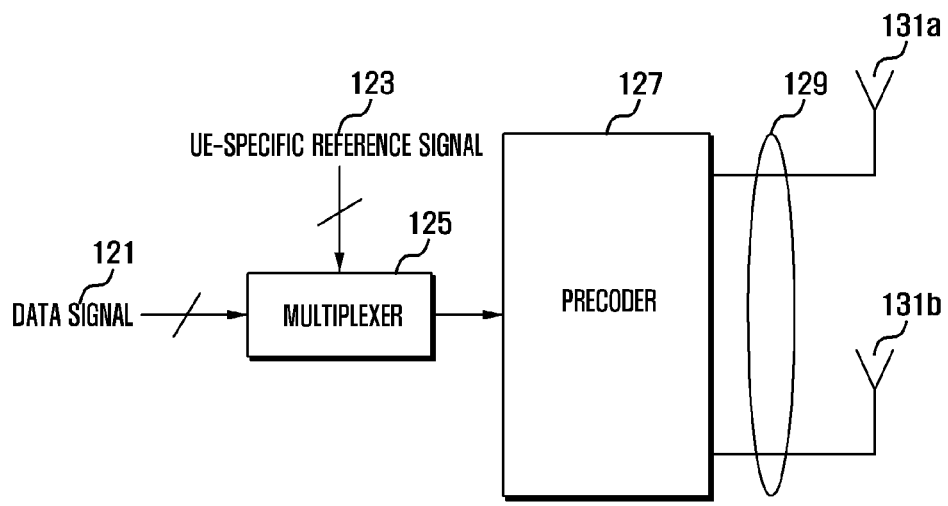
FIG. 2 is a block diagram illustrating a configuration of a downlink transmitter using DRS in the LTE system.

FIG. 2 is a diagram illustrating a configuration of a downlink transmitter using DRS in the LTE system. Although the description is directed to a transmitter having two transmit antennas, the present invention is not limited thereto. For example, the present invention can be applied to transmitters having more than two transmit antennas. Although the DRS is limited to the single layer transmission in the LTE system, the DRS concept can be applied to spatial multiplexing for transmission with a maximum of 8 layers in the LTE-A system.

As shown in FIG. 2, the transmitter 120 includes a multiplexer 125, a precoder 127, a first transmit antenna 131a, and a second transmit antenna 131b. Here, the transmitter 120 performs multiplexing and precoding on both the data signal 121 and DRS 123 before transmission.

The multiplexer 125 multiplexes the data signal 121 and DRS 123 to be transmitted to the receiver (not shown) and outputs the multiplexed signal to the precoder 127. The precoder 127 performs precoding on the multiplexed signal and transmits the precoded signal 129 through the first transmit antenna 131a and the second transmit antenna 131b. The precoded signal 129 includes the data signal 121 and DRS 123, and the receiver can estimate the channel of the data signal 121 and the channel response precoded by reflecting both the precoding scheme and channel response of DRS 123.

Figure 3:
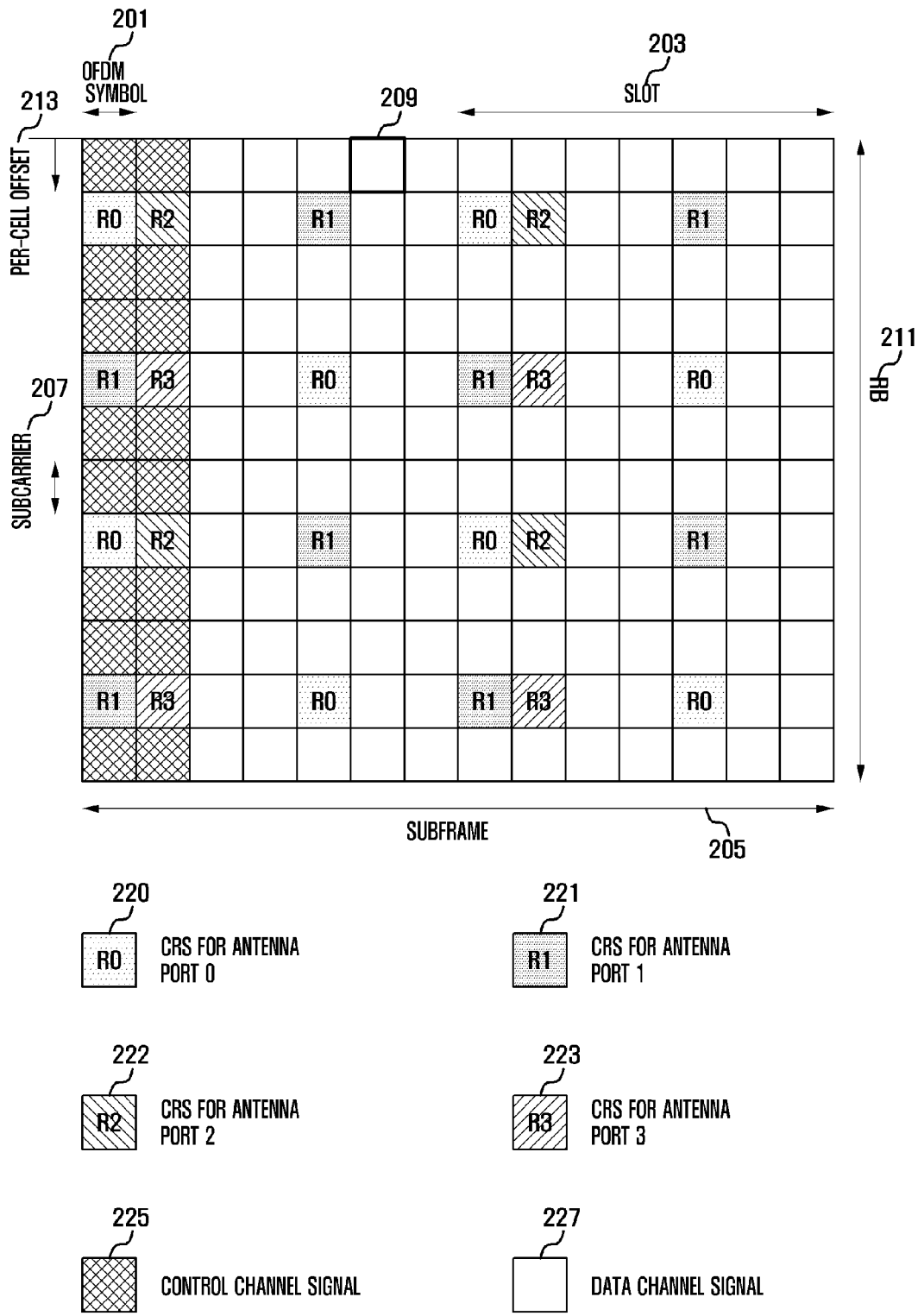
FIG. 3 is a diagram illustrating mappings of reference signals to downlink resources in the LTE system according to an embodiment of the present invention.

FIG. 3 is a diagram illustrating mappings of reference signals to downlink resources in the LTE system according to an embodiment of the present invention. Although the description is directed to a normal Cyclic Prefix (CP) subframe structure in the downlink, the present invention is not limited thereto. For example, the present invention can be applied to an extended CP subframe structure in the downlink.

Referring to FIG. 3, the minimum resource unit is an OFDM symbol in the time domain. For normal CP, a slot 203 consists of 7 OFDM symbols 201. A subframe 205 consists of two slots 203. The scheduling in the time domain is done on a subframe basis. The first one to three OFDM symbols at the beginning of each subframe are used for transmitting control channels and the remaining OFDM symbols are used for transmitting data channels. The minimum resource unit in the frequency domain is subcarrier 207. One resource block (RB) 211 consists of 12 subcarriers. The scheduling in the frequency domain is done on an RB basis. A Resource Element (RE) 209 as the minimum resource unit is defined by a subcarrier in the frequency domain, an OFDM symbol in the time domain, and an antenna port (not shown) in the spatial domain, and carries one modulation symbol.

For the case of four antenna ports, the transmitter defines the CRSs 220, 221, 222, and 223 for the individual antenna ports. In order to allow for the receiver to estimate the channels of the antenna ports 0, 1, 2, and 3, the transmitter transmits CRS0 220 for antenna port 0, CRS1 221 for antenna port 1, CRS2 222 for antenna port 2, and CRS3 223 for antenna port 3. At this time, CRS0 220, CRS1 221, CRS2 222, and CRS3 223 are mapped to respective REs so as to be transmitted in a distributed manner. This means that CRS0 220, CRS1 221, CRS2 222, and CRS3 223 are orthogonal to each other. The transmitter transmits the control channel signal 225 on the REs in the control channel region and the data channel signal 227 on the REs in the data channel region. In order to map the CRSs 220, 221, 222, and 223 per cell differently, a per-cell offset 213 is determined depending on the cell identifier.

In the above configured OFDM system, the transmitter can transmit the data signal and CRS in one of the Transmission Modes (TDs) listed in Table 1. In Table 1, common transmission modes available in the downlink of the LTE system are listed. The LTE system uses the channel response estimation based on CRS. The CRS-based reference transmission schemes according to the common transmission modes include signal antenna transmission mode with antenna port 0, transmission diversity mode, Open-loop spatial multiplexing mode, closed-loop spatial multiplexing mode, multiuser Multiple Input Multiple Output (MIMO) mode, and single antenna transmission mode with antenna port 5. In the LTE system, the DRS-based channel response estimation is allowed as a single common transmission mode and is referred as single antenna transmission mode with antenna port 5 under the assumption that the DRS is the CRS for antenna port 5. In the following description, DRS is regarded as a kind of CRS and is used interchangeably with the term CRS.

Although the LTE system supports various reference signal transmission modes, it is not possible to select all of the reference signal transmission modes freely for every transmission. The individual reference signal transmission modes need different DCIs, and the receiver must know which DCI it receives. If the transmitter designates a specific common transmission mode for a single receiver, the receiver operates in the reference transmission scheme of the corresponding common transmission mode. Since the common transmission mode is configured by means of higher layer signaling, there can be a configuration time delay. Also, in the case where the reference transmission scheme of the common transmission mode configured for a specific receiver is changed to an invalid channel condition, there is a need for a fallback transmission scheme to change the common transmission mode of the corresponding receiver. Since the transmission diversity scheme is least affected by the variation of channel condition among the reference transmission schemes, it is used as the fallback transmission scheme in the LTE system.

TABLE 1

| Transmission Mode | Reference Transmission Scheme | Fallback Transmission Scheme |
|---|---|---|
| tm1 | Single antenna Tx; antenna port 0 | Transmission Diversity |
| tm2 | Transmission Diversity | |
| tm3 | Open-loop Spatial Multiplexing | |
| tm4 | Closed-loop Spatial Multiplexing | |
| tm5 | Multiuser MIMO | |
| tm6 | Closed-loop rank-1 precoding | |
| tm7 | Single antenna Tx; antenna port 5 | |

In the transmission diversity scheme, the transmitter transmits the CRS in all subframes. There is only one exception: the CRS is not transmitted in the data channel region of an MBSFN subframe for supporting Multicast Broadcast Single Frequency Network (MBSFN) transmission. In MBSFN, multiple cells transmit the same broadcast signals to extend the broadcast service area. In order to enable the receiver to perform coherent demodulation on the signal transmitted by multiple cells simultaneously, MBSFN transmission is allowed for the multiple cells to transmit the same RS.

Since it is impossible to support MBSFN with the CRSs defined per cell, an MBSFN-specific RS is defined to be transmitted in the MBSFN subframe. Accordingly, the LTE receiver configured to receive a unicast service extracts the CRS from the normal subframes, excluding the MBSFN subframe, to estimate the data channel. For this, the MBSFN subframe configuration is informed to the LTE receiver supporting unicast service by means of higher layer signaling such that the receiver distinguishes the MBSFN subframe from other normal subframes.

Figure 4:
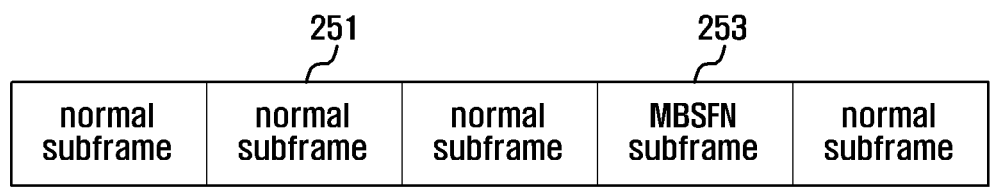
FIG. 4 is a diagram illustrating a signal format in which an MBSFN subframe is time division multiplexed according to an embodiment of the present invention.

FIG. 4 is a diagram illustrating a signal format in which an MBSFN subframe is time division multiplexed.

As shown in FIG. 4, an MBSFN subframe 253 is multiplexed with normal subframes 251 in time domain. The receiver extracts CRS from the normal subframes 251 to estimate the data channel. In contrast, the receiver does not perform a CRS extraction operation in the MBSFN subframe.

Exploiting this characteristic, the MBSFN subframe can be used as the resource optimized for the receiver in the LTE system. This means that the MBSFN subframe can be used for the LTE-A system to maintain backward compatibility with the LTE system. For this purpose, a new RS extended from the DRS is introduced in the LTE-A subframe and is referred to as DeModulation RS (DM-RS). The LTE-A receiver extracts the DM-RS to estimate channel response. Also, the transmitter must transmit the CRS in the normal subframes for the LTE receivers. In view of the LTE-A receiver, the resource used for carrying the CRS is useless. In view of the LTE receiver, however, since it is not expected that the CRS is transmitted in the data channel region of the MBSFN subframe, the LTE receiver recognizes the MBSFN subframe as an LTE-A subframe. Meanwhile, the LTE-A receiver recognizes the LTE-A subframe as the subframe optimized for the LTE system. Accordingly, the LTE-A subframe can be used without compromising the backward compatibility with the LTE system without carrying the CRS.

Figure 5:
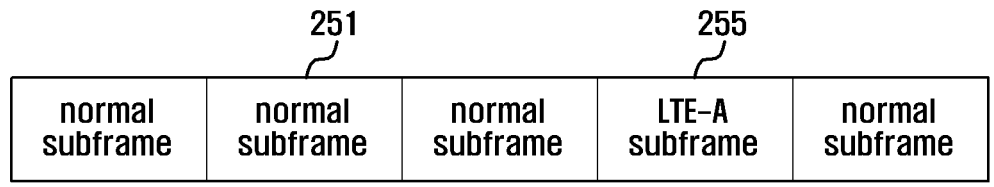
FIG. 5 is a diagram illustrating a signal format in which an LTE-A subframe is time division multiplexed according to an embodiment of the present invention.

FIG. 5 is a diagram illustrating a signal format in which an LTE-A subframe is time division multiplexed.

As shown in FIG. 5, an LTE-A subframe 255 is multiplexed with normal subframes 251 in time domain. The LTE-A subframe is recognized, by the LTE receiver, as the MBSFN subframe and, by the LTE-A receiver, as a subframe optimized for the LTE-A system. Accordingly, although the transmitter has to transmit both the CRS and DM-RS for backward compatibility and demodulation at the LTE-A receiver in the normal subframe, it is possible to transmit only the DM-RS for the LTE-A receiver in the data channel region of LTE-A subframe 255 without the CRS.

In the downlink of the LTE-A system, the transmitter transmits the CRS for the LTE receivers and DM-RS for the LTE-A receivers. Here, DM-RS is a kind of RS extended from DRS for supporting spatial multiplexing. Under the assumption that a maximum of eight spatial layers can be supported, it is necessary to define a maximum of eight orthogonal DM-RSs. One of the significant reasons why the DM-RS is introduced is to use various precoding schemes. The precoding based on the precoding codebook is limited to be used for Multi-User MIMO (MU-MO) and increases the complexity of the DCI used for supporting CoMP JT. In order to support the transmission schemes to be introduced or modified in the LTE-A system efficiently, it has been decided to introduce the new RS, i.e. DM-RS, rather than reuse the CRS.

In the normal subframe, however, the transmitter must transmit the CRS for the LTE receiver along with the DM-RS for the LTE-A receiver. It is always necessary to transmit two kinds of RSs even though the DM-RS-based transmission scheme of the LTE-A system is very efficient, and the RS overload can be excessive. This may cause a situation where the DM-RS-based transmission scheme of the LTE-A system becomes inferior to that of the LTE system in data rate. Accordingly, it is necessary to configure the LTE-A receiver to receive the CRS selectively so as to improve the data rate.

In order to support transmission modes using multiple transmit antennas in the downlink of LTE and LTE-A systems, the higher layer signaling is defined as shown in Table 2. The higher layer signaling includes an Information Element to notify of the transmit antennas per receiver, and the Information Element can be defined as 'AntennaInfoDedicated'. The AntennaInfoDedicated includes a mode Information Element for indicating at least one of the common transmission modes of LTE systems and dedicated transmission modes of LTE-A systems. The mode Information Element can be defined as 'transmissionMode' and is a 3-bit information indicating one of the common and dedicated transmission modes. The receiver can estimate the data channel using the CRS in the common transmission mode and the DM-RS in the dedicated transmission mode.

TABLE 2

```
AntennaInfoDedicated ::=   SEQUENCE {
   transmissionMode         ENUMERATED {
                              tm1, tm2, tm3, tm4, tm5, tm6, tm7,
spare1},
   The rest is omitted.
}
```

Figure 6:
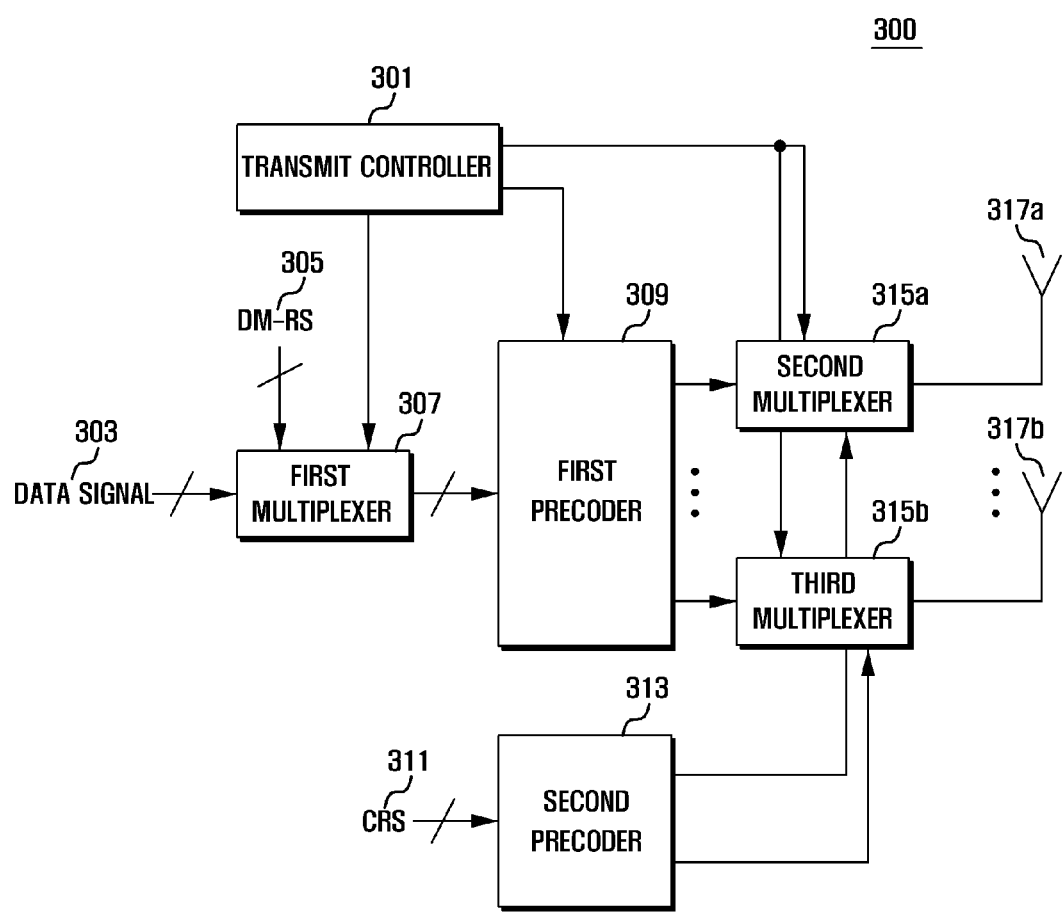
FIG. 6 is a block diagram illustrating a configuration of a transmitter according to an embodiment of the present invention.

FIG. 6 is a block diagram illustrating a configuration of a transmitter according to an embodiment of the present invention. Although the description is directed to a transmitter configured with two transmit antennas, the present invention is not limited thereto. For example, the present invention can be applied to transmitters configured with more than two transmit antennas.

As shown in FIG. 6, the transmitter 300 includes a transmit controller 301, a first multiplexer 307, a first precoder 309, a second precoder 313, a second multiplexer 315a, a third multiplexer 315b, a first transmit antenna 317a, and a second transmit antenna 317b. The transmitter 300 multiplexes the data signal 303 with DM-RS 305 or CRS 311 before transmission. That is, the transmitter 300 transmits the DM-RS 305 in the LTE-A subframe and the CRS 311 in the normal subframe for backward compatibility.

The transmit controller 301 determines whether the current subframe is an LTE-A subframe or a normal subframe and, as a consequence, determines whether to transmit the DM-RS. If the current subframe is an LTE-A subframe, the transmit controller 301 controls such that the DM-RS 305 is transmitted in the LTE-A subframe. Otherwise, if the current subframe is a normal subframe, the transmit controller 301 controls such that the DM-RS 305 is not transmitted in the normal subframe. At this time, the transmit controller 301 notifies of the transmission of DM-RS 305 by means of higher layer signaling. The higher layer signaling can include a mode Information Element to indicate one of the common transmission mode representing the data transmission scheme based on the CRS 311 or the transmission mode representing the data transmission scheme based on the DM-RS 305. In the case of the LTE-A subframe, the transmit controller 301 controls such that the data signal 303, DM-RS 305, and CRS 311 are transmitted. At this time, the transmit controller 301 determines the number of DM-RSs 305 depending on the number of spatial multiplexing layers. In the case of the normal subframe, the transmit controller 301 controls such that the data signal 303 and CRS 311 are transmitted. Although not depicted in FIG. 6, a signal generator can generate the data signal 303, DM-RS 305, and CRS 311 under the control of the transmit controller 301.

If the signal generator inputs the data signal 303 and DM-RS 305 to the first multiplexer 307, the first multiplexer 307 multiplexes in data signal 303 and DM-RS 305 and outputs the multiplexed signal to the first precoder 309. The first precoder 309 performs identical precoding on the DM-RS 305 and the data signal 303. If the data signal 303 is input without DM-RS 305, the first multiplexer 307 multiplexes the data signal 303 and outputs the multiplexed signal to the first precoder 309. The first precoder 309 performs precoding on the signal output by the first multiplexer 307. At this time, which precoding scheme is used for which receiver in the first precoder 309 is determined by the transmit controller 301.

If the signal generator inputs the CRS 311 to the second precoder 313, the second precoder 313 performs fixed precoding on the CRS 311. Here, the fixed precoding adopts the same precoding scheme constantly rather than change the precoding scheme according to variations of the channel condition of the receiver. The reason why the fixed precoding scheme is used is to introduce a rule for arranging a maximum 4 CRSs of LTE system to support a maximum 8 transmit antennas since the LTE receiver recognizes the maximum 8 transmit antennas of the LTE-A system as 4 transmit antennas. This process is referred to as antenna virtualization. At this time, the second precoder 313 determines how to arrange the CRS 311 for the first and second transmit antennas 317a and 317b.

If the precoded data signal 303 and DM-RS 305 are input by the first precoder 309, the second and third multiplexers 315a and 315b multiplex the precoded data signal 303 and the precoded DM-RS 305 and transmits the multiplexed signals through the first and second transmit antennas 317a and 317b. If the precoded data signal 303 and the precoded CRS 311 are input by the respective first and second precoders 309 and 313, the second and third multiplexers 315a and 315b multiplex the precoded data signal 303 and CRS 311 and transmit the multiplexed signals through the first and second transmit antennas 317a and 317b, respectively.

Figure 7:
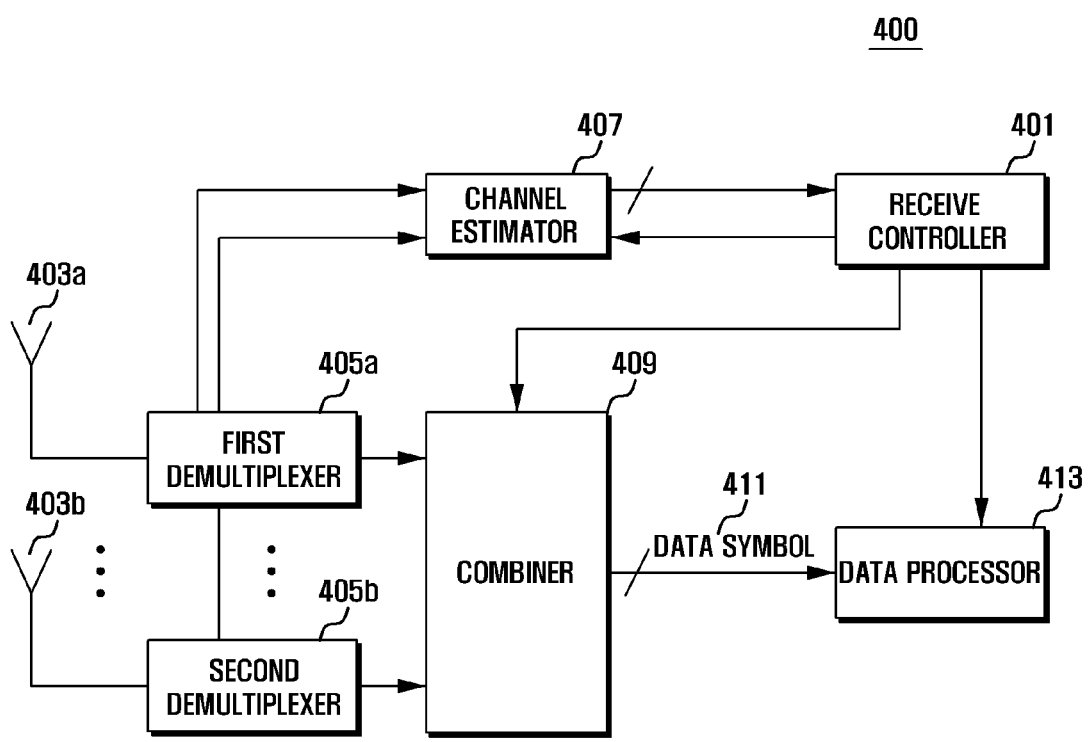
FIG. 7 is a block diagram illustrating a configuration of a receiver according to an embodiment of the present invention.

FIG. 7 is a block diagram illustrating a configuration of a receiver according to an embodiment of the present invention. Although the description is directed to a receiver configured with two receive antennas, the present invention is not limited thereto. For example, the present invention can be applied to receivers configured with more than two receive antennas.

As shown in FIG. 7, the receiver 400 includes a receive controller 401, a first receive antenna 403a, a second receiver antenna 403b, a first demultiplexer 405a, a second demultiplexer 405b, a channel estimator 407, a combiner 409, and a data processor 413.

The receive controller 401 analyzes the higher layer signaling to determine whether the current subframe is an LTE-A subframe or a normal subframe and, as a consequence, determines whether to receive the CRS or the DM-RS in the current subframe. The type of RS can be determined based on the mode Information Element of the higher layer signaling. If the current subframe is an LTE-A subframe, the receive controller 401 controls such that the DM-RS is extracted from the LTE-A subframe. Otherwise, if the current subframe is a normal subframe, the receive controller 401 controls such that the CRS is extracted from the normal subframe.

If the signals are received by the first and second receive antennas 403a and 403b, the first and second demultiplexers 405a and 405b perform demultiplexing on the received signals to extract the RSs and data signals. At this time, the first and second demultiplexers 405a and 405b outputs the RSs to the channel estimator 407 and the data signals to the combiner 409, respectively.

The channel estimator 407 estimates the channel using the RSs input by the first and second demultiplexers 405a and 405b. At this time, if it is determined by the receive controller 401 that the current subframe is an LTE-A subframe, the channel estimator 407 performs channel estimation using the channel estimation scheme according to the DM-RS pattern. Otherwise, if it is determined by the receive controller 401 that the current subframe is a normal subframe, the channel estimator 407 performs channel estimation using the channel estimation scheme according to the CRS pattern and estimates the precoded channel in consideration of the precoding scheme indicated by the DCI. Next, the channel estimator 407 sends the channel estimation result to the receive controller 401. The receive controller 401 determines a combining coefficient indicating how to combine the received data signals and sends the combining coefficient to the combiner 409.

If the combining coefficient is input, the combiner 409 combines the data signals in a manner according to the combining coefficient to recover the data symbol 411. The data processor 413 performs demodulation and decoding on the data symbol 411 to recover the original information bit sequence. At this time, the receive controller 401 notifies the data processor 413 of the modulation and coding scheme indicated by DCI such that the data processor 413 performs demodulation and decoding corresponding to the modulation and coding scheme. The RS processing method for the receiver to receive data signals is described in detail hereinafter.

Figure 8:
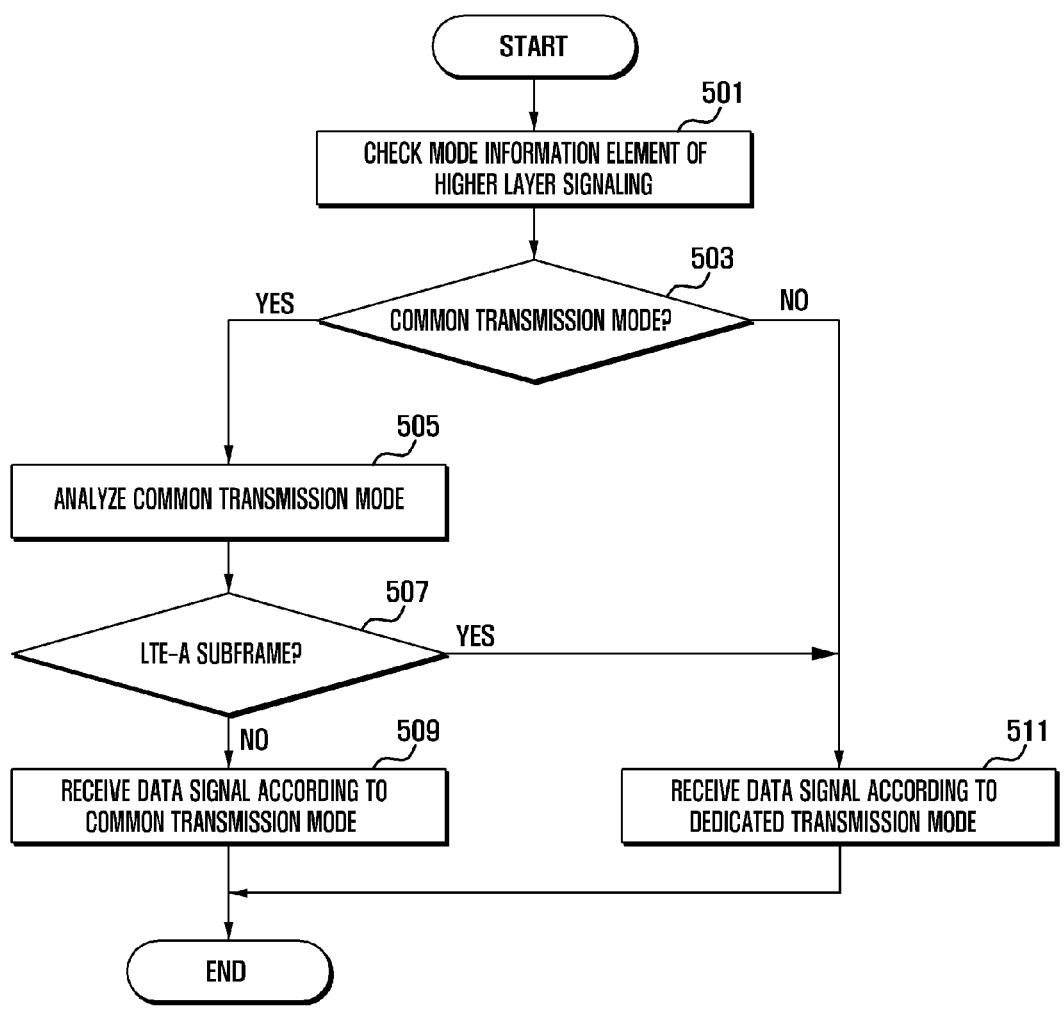
FIG. 8 is a flowchart illustrating a reference signal processing method for a receiver according to a first embodiment of the present invention.

FIG. 8 is a flowchart illustrating a reference signal processing method for a receiver according to a first embodiment of the present invention. In this embodiment, the status Information Element, e.g. 'AntennaInfoDedicated', includes a mode Information Element, e.g. 'reuseRel8TM'. In this embodiment, 'transmissionMode' and 'reuseRel8TM' can be defined as the mode Information Element in 'AntennaInfoDedicated'. If the mode Information Element is set (reuseRel8TM=set), this means that the common transmission mode is used in the normal subframe.

Referring to FIG. 8, the receive controller 401 checks the mode Information Element of the higher layer signaling in step 501. That is, the receive controller 401 checks the status Information Element of the higher layer signaling, e.g. the mode Information Element of 'AntennaInfoDedicated'. Next, the receive controller 401 determines whether the mode Information Element is set to common transmission mode in step 503. That is, the receive controller 401 determines whether the 'reuseRel8TM' is set in the 'AntennaInfoDedicated'.

If the mode Information Element, i.e. 'reuseRel8TM', is set at step 503, the receive controller 401 analyzes the common transmission mode in step 505. That is, the receive controller 401 can determine temporarily to estimate the channel using the CRS in the current subframe. Also, the receive controller 401 analyzes 'transmissionMode' in the mode Information Element to check the common transmission mode to be used. Next, the receive controller 401 determines whether the current subframe is an LTE-A subframe in step 507.

If the current subframe is not an LTE-A subframe, the receive controller 401 receives data signals according to the common transmission mode in step 509. That is, the receive controller 401 regards the current subframe as the normal subframe containing the CRS. Finally, the receive controller 401 estimates the data channel using the CRS to receive data signals.

If the current subframe is an LTE-A subframe at step 507, the receive controller 401 receives the data signal according to the dedicated transmission mode in step 511. That is, the receive controller 401 estimates the data channel using the DM-RS to receive data signals.

Meanwhile, if the mode Information Element, i.e. 'reuseRel8TM', is not set at step 503, the receive controller 401 receives the data signal according to the dedicated transmission mode in step 511. At this time, the receive controller 401 performs step 511 without determination on whether the current subframe is LTE-A subframe or normal subframe. That is, the receive controller 401 determines temporarily to estimate the channel using the DM-RS and thus estimates the data channel using the DM-RS to receive data signals.

Figure 9:
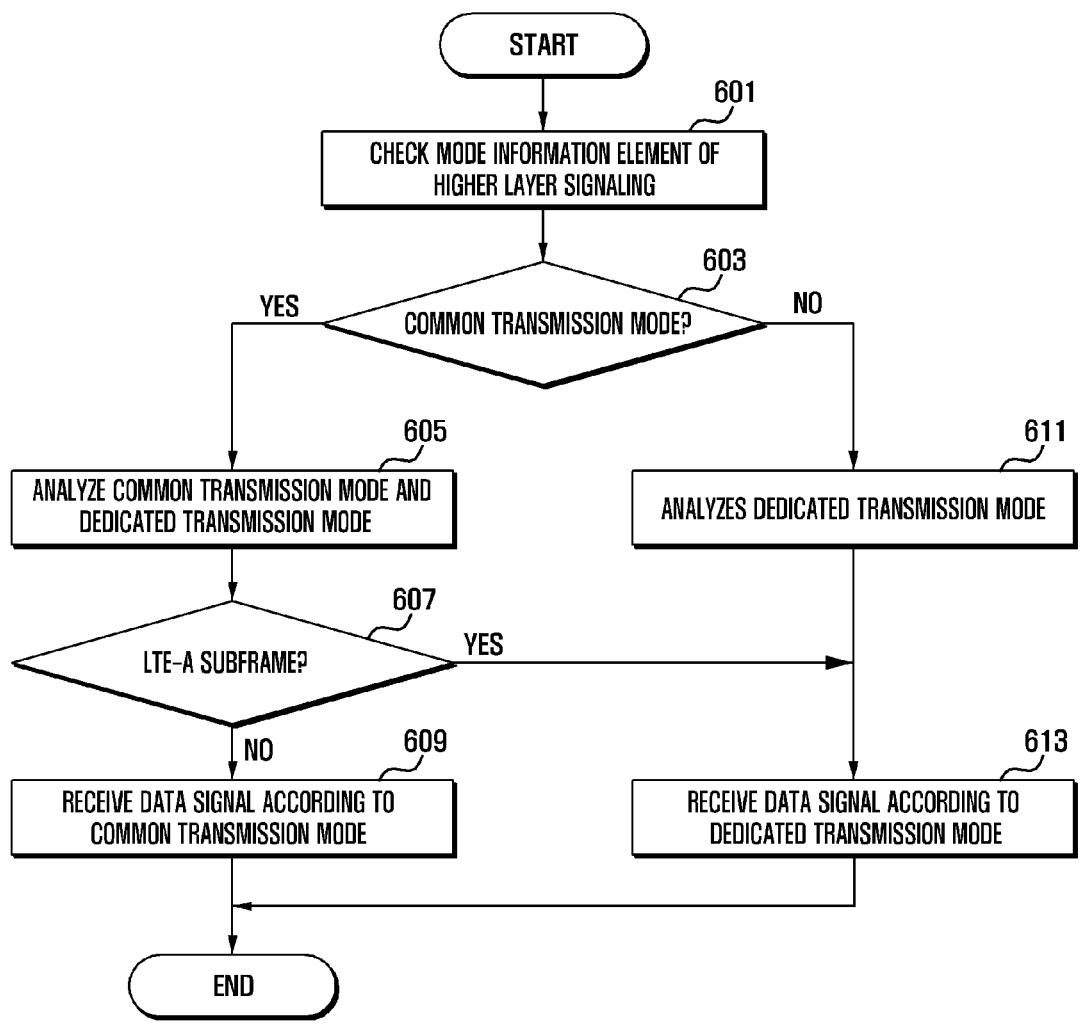
FIG. 9 is a flowchart illustrating a reference signal processing method for a receiver according to a second embodiment of the present invention.

FIG. 9 is a flowchart illustrating a reference signal processing method for a receiver according to a second embodiment of the present invention. When multiple dedicated transmission modes are available in the downlink of the LTE-A system, the method according to this embodiment can be applied. In this embodiment, the status Information Element, e.g. 'AntennaInfoDedicate', includes a mode Information Element, e.g. 'rel8Transmission Mode' for indicating the common transmission mode and 'rel10TransmissionMode' for indicating the dedicated transmission mode. That is, 'reuseRel8TM', 'rel8TransmissionMode, and 'rel10TransmissionMode' can be defined as the mode Information Element of 'AntennaInfoDedicated' in this embodiment. When it is configured to not use the common transmission mode, 'rel8TransmissionMode is not configured in AntennaInfoDedicated'.

Referring to FIG. 9, the receive controller 401 first checks the mode Information Element of the higher layer signaling in step 601. That is, the receive controller 401 checks the status Information Element of the higher layer signaling, e.g. the mode Information Element of 'AntennaInfoDedicated'. Next, the receive controller 401 determines whether the mode Information Element is set to the common transmission mode in step 603. That is, the receive controller 401 determines whether the 'reuseRel8TM' is set in the 'AntennaInfoDedicated'.

If the mode Information Element, i.e. 'reuseRel8TM', is set at step 603, the receive controller 401 analyzes the common transmission mode and dedicated transmission mode in step 605. At this time, the receive controller 401 can temporarily determine to estimate the channel using the CRS in the current subframe. Also, the receive controller 401 analyzes 'rel8TransmissionMode' and 'rel10TransmissionMode' in the mode Information Element to check the available common transmission mode and dedicated transmission mode. Next, the receive controller 401 determines whether the current subframe is an LTE-A subframe in step 607.

If the current subframe is not LTE-A subframe, the receive controller 401 receives data signals according to the common transmission mode in step 609. At this time, the receive controller 401 receives data signals according to the common transmission mode corresponding to 'rel8TransmissonMode'. That is, the receive controller 401 regards the current subframe as the normal subframe containing the CRS. Finally, the receive controller 401 estimates the data channel using the CRS to receive data signals.

If the current subframe is an LTE-A subframe at step 607, the receive controller 401 receives data signals according to the dedicated transmission mode in step 613. At this time, the receive controller 401 receives the data signals according to the dedicated transmission mode corresponding to 'rel10TransmissionMode'. That is, the receive controller 401 estimates the data channel using the DM-RS to receive data signals.

Meanwhile, if the mode Information Element, i.e. 'reuseRel8TM', is not set at step 603, the receive controller 401 analyzes the dedicated transmission mode in step 611. At this time, the receive controller 401 determines to estimate the channel using the DM-RS in the current subframe. The receive controller 401 analyzes 'rel10TransmissionMode' in the mode Information Element to check the available dedicated transmission mode. Next, the receive controller 401 receives the data signal according to the dedicated transmission mode in step 613. At this time, the receive controller 401 performs step 613 without a determination on whether the current subframe is an LTE-A subframe or a normal subframe.

Figure 10:
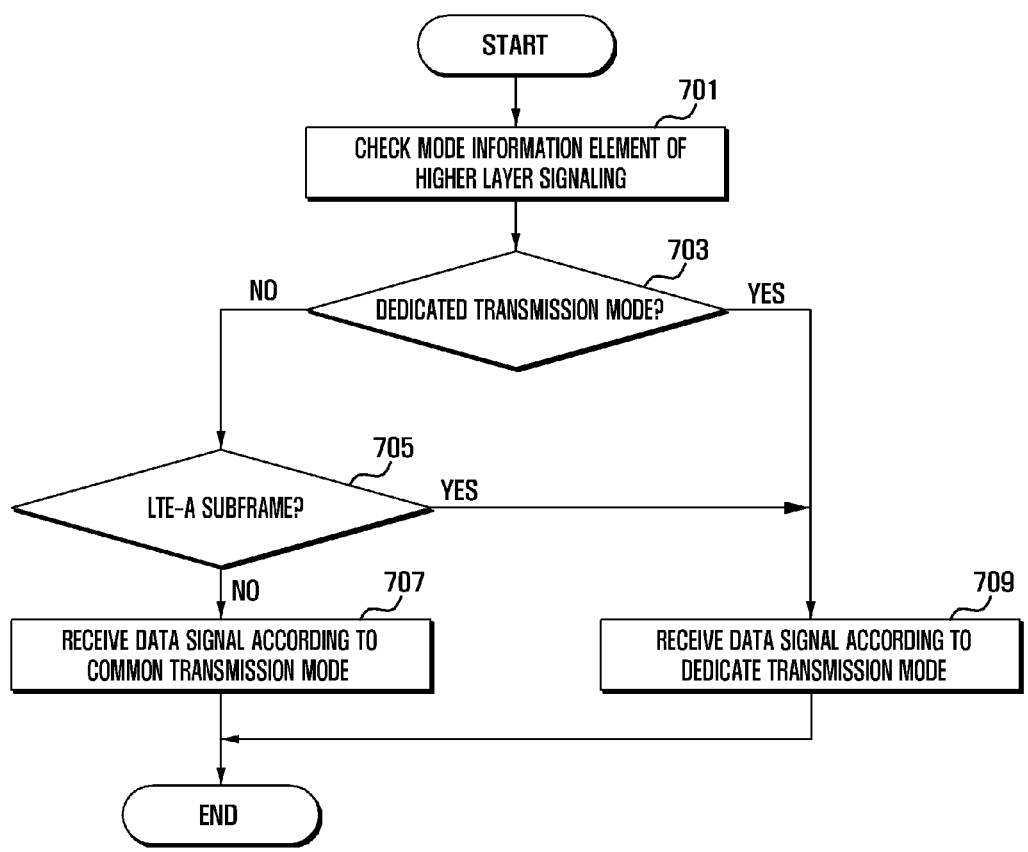
FIG. 10 is a flowchart illustrating a reference signal processing method for a receiver according to a third embodiment of the present invention.

FIG. 10 is a flowchart illustrating a reference signal processing method for a receiver according to a third embodiment of the present invention. In this embodiment, a new dedicated transmission mode is provided for the LTE-A system as shown in Table 3. In Table 3, the transmission modes from 'tm1' to 'tm7' are common transmission modes, and the transmission mode 'tm8' is the dedicated transmission mode using the DM-RS. In the new dedicated transmission mode, the transmission diversity scheme is used as the fallback transmission scheme. In this embodiment, the mode Information Element, e.g. the value set to spare1 in 'transmissionMode' is replaced by 'tm8' rather than newly defining the mode Information Element of 'AntennaInfoDedicated', e.g. 'reuseRel8TM'.

TABLE 3

| Transmission Mode | Reference Transmission Scheme | Fallback Transmission Scheme |
|---|---|---|
| tm1 | Single antenna Tx; antenna port 0 | Transmission Diversity |
| tm2 | Transmission Diversity | |
| tm3 | Open-loop Spatial Multiplexing | |
| tm4 | Closed-loop Spatial Multiplexing | |
| tm5 | Multiuser MIMO | |
| tm6 | Closed-loop rank-1 precoding | |
| tm7 | Single antenna Tx; antenna port 5 | |
| tm8 | LTE-A transmission scheme with DM-RS | |

Referring to FIG. 10, the receive controller 401 first checks the mode Information Element of the higher layer signaling in step 701. That is, the receive controller 401 checks the status Information Element of the higher layer signaling, e.g. the mode Information Element of 'AntennaInfoDedicated'. Next, the receive controller 401 determines whether the mode Information Element is set to the dedicated transmission mode in step 703. That is, the receive controller 401 determines whether the 'transmissionMode' is set to 'tm8'.

If the dedicated transmission mode, i.e., 'tm8', is not set at step 703, the receive controller 401 determines whether the current subframe is an LTE-A subframe in step 705. If the current subframe is not the LTE-A subframe at step 705, the receive controller 401 receives the data signal according to the common transmission mode in step 707. Here, the common transmission mode can be a default common transmission mode determined by the receive controller 401. That is, the receive controller 401 regards the current subframe as a normal subframe including the CRS. Accordingly, the receive controller 401 estimates the channel with the CRS to receive data signals.

If the dedicated transmission mode, i.e. 'tm8', is set at step 703 or if the current subframe is an LTE-A subframe, the receive controller 401 receives the data signals according to the dedicated transmission mode in step 709.

As described above, the method and apparatus for transmitting/receiving reference signals in a wireless communication system according to the present invention enables an LTE-A receiver to support the LTE transmission scheme using the CRS, resulting in backward compatibility and improvement of usability of the receiver. Also, the method and apparatus for transmitting/receiving reference signals in a wireless communication system according to the present invention is advantageous to increase system throughput and enhance data reception probability at the LTE-A receiver.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for receiving data, the method comprising:
receiving transmission mode information and Multicast Broadcast Single Frequency Network (MBSFN) subframe information through higher layer signaling;
identifying that the transmission mode information indicates a predetermined transmission mode; and
receiving data associated with at least one User Equipment (UE)-specific reference signal in an MBSFN subframe and receiving data associated with at least one cell-specific reference signal in a non-MBSFN subframe based on the predetermined transmission mode,
wherein the predetermined transmission mode supports transmission based on up to 8 UE-specific reference signals.

2. The method of claim 1, wherein the at least one UE-specific reference signal is precoded with data and the at least one cell-specific reference signal is not precoded with data.

3. The method of claim 1, wherein the predetermined transmission mode is for a Long Term Evolution-Advanced (LTE-A) UE.

4. An apparatus for receiving data, the apparatus comprising:
a receiver controller configured to identify transmission mode information and Multicast Broadcast Single Frequency Network (MBSFN) subframe information through higher layer signaling, identify that the transmission mode information indicates a predetermined transmission mode, and control to receive data associated with at least one User Equipment (UE)-specific reference signal in an MBSFN subframe and receive data associated with at least one cell-specific reference signal in a non-MBSFN subframe based on the predetermined transmission mode; and
a data process configured to recover the received data,
wherein the predetermined transmission mode supports transmission based on up to 8 UE-specific reference signals.

5. The apparatus of claim 4, wherein the at least one UE-specific reference signal is precoded with data and the at least one cell-specific reference signal is not precoded with data.

6. The apparatus of claim 4, wherein the predetermined transmission mode is for a Long Term Evolution-Advanced (LTE-A) UE.

7. A method for transmitting data, the method comprising:
transmitting transmission mode information and Multicast Broadcast Single Frequency Network (MBSFN) subframe information through higher layer signaling, the transmission mode information indicating a predetermined transmission mode; and
transmitting data associated with at least one User Equipment (UE)-specific reference signal in an MBSFN subframe and transmitting data associated with at least one cell-specific reference signal in a non-MBSFN subframe based on the predetermined transmission mode, if the transmission mode information is associated with the predetermined transmission mode,
wherein the predetermined transmission mode supports transmission based on up to 8 UE-specific reference signals.

8. The method of claim 7, wherein the at least one UE-specific reference signal is precoded with data and the at least one cell-specific reference signal is not precoded with data.

9. The method of claim 7, wherein the predetermined transmission mode is for a Long Term Evolution-Advanced (LTE-A) transmitter.

10. An apparatus for transmitting data, the apparatus comprising:
a transmit controller configured to identify transmission mode information and Multicast Broadcast Single Frequency Network (MBSFN) subframe information, the transmission mode information indicating a predetermined transmission mode; and
at least one antenna configured to transmit the transmission mode information and the MBSFN subframe information through higher layer signaling, and transmit data associated with at least one User Equipment (UE)-specific reference signal in an MBSFN subframe and transmit data associated with at least one cell-specific reference signal in a non-MBSFN subframe based on the predetermined transmission mode,
wherein the predetermined transmission mode supports transmission based on up to 8 UE-specific reference signals.

11. The apparatus of claim 10, wherein the at least one UE-specific reference signal is precoded with data and the at least one cell-specific reference signal is not precoded with data.

12. The apparatus of claim 10, wherein the predetermined transmission mode is for a Long Term Evolution-Advanced (LTE-A) UE.

\* \* \* \* \*